Patented Aug. 11, 1936

2,050,671

UNITED STATES PATENT OFFICE 2,050,671

METHOD FOR THE SEPARATION OF TERPENE ALCOHOLS FROM PINE OIL

Donald H. Sheffield, Brunswick, Ga., assignor to Hercules Powder Company, Wilmington, Del., a corporation of Delaware No Drawing. Application July 17, 1934,
Serial No. 735,630

10 Claims. (Cl. 260—153)

This invention relates to a method for the separation of terpene alcohols, such as, for example, terpineol, borneol, fenchyl alcohol, etc., from pine oil.

It is known that terpene alcohols form with boric acid difficultly volatile esters which can be readily saponified for the recovery of the terpene alcohol. However, for reasons hereinafter stated, procedure involving the formation of such esters and their subsequent saponification has not hitherto been utilized for the direct recovery of substantially pure terpene alcohols from the pine oil obtained from the longleaf yellow pine, altho this pine oil is the principal source of terpene alcohols in the United States.

The term "pine oil" as used throughout this specification and in the claims hereinafter set forth refers to the pine oil of the longleaf yellow pine. This pine oil is a liquid of characteristic, pleasant odor, having a boiling range of about 200° C. to about 235° C. and a specific gravity within about the range .932–.947. Its composition is not entirely definite, but varies somewhat according to the method used in producing it. It contains both terpene alcohols and terpene hydrocarbons, as well as terpene ethers, ketones, etc. in small amounts. The terpene alcohol content of pine oil is usually about 75% to 90%, of which terpineol, a tertiary alcohol, represents about 50%–70% and borneol and fenchyl alcohol, both secondary alcohols, represent about 20% and 30% respectively.

Since it is desirable to recover both the secondary and tertiary alcohols from pine oils, and preferably separately, and since it was not thought that the borates of the secondary alcohols could be formed in the presence of the much larger quantities of tertiary alcohol present, it has not hitherto been considered feasible to recover terpene alcohols directly from natural pine oil by treatment with boric acid.

It is accordingly the purpose of this invention to provide procedure whereby both tertiary and secondary terpene alcohols may be recovered directly in substantially pure form from natural pine oil by treatment of the pine oil under suitable conditions with boric acid.

The method in accordance with this invention comprises essentially the treatment of pine oil with boric acid under such conditions that substantially all the terpene alcohols present will be converted into borates, the separation of the remaining constituents of the pine oil from the borates by distillation, and the saponification of the borates to terpene alcohols again, which may then be separated from each other by fractional crystallization, if desired.

The esterification may, if desired, be conducted under such conditions that only the borates of secondary alcohols will be produced. In this way substantially pure secondary alcohols may be produced.

In accordance with this invention pine oil is mixed with boric acid, the boric acid desirably being added in an amount equal to about 20% by weight of the amount of terpene alcohols present in the pine oil (as determined by previous analysis), and the mixture is heated at a temperature of from about 100° C. to about 170° C. until the distillation of water from the reaction mixture ceases, usually a period of about four to five hours. The temperature may be conveniently controlled by adding to the reaction mixture an inert solvent, e. g. naphtha, having a boiling point approximating the desired reaction temperature and conducting the reaction at the boiling temperature of this solvent, while returning the solvent from a reflux condenser. However, any other method of temperature control may be utilized.

When the esterification reaction is complete, the reaction mixture is subjected to distillation under a partial vacuum of about 650 mm., the temperature being maintained within about the same range as during the esterification reaction. Under these conditions substantially all the terpene hydrocarbons, ketones, and ethers present in the pine oil will distill off, leaving in the still pot the borates of the terpene alcohols. These borates are subjected to steam distillation either under atmospheric pressure or under a partial vacuum, whereby the borates are hydrolyzed to terpene alcohols and boric acid. The terpene alcohols, together with water, distill over and are obtained in substantially pure form by separation from the water, with which they are immiscible. Upon completion of the steam distillation there remains in the still a concentrated aqueous solution of boric acid together with a small quantity of high boiling oils. Boric acid for reuse in the process is recovered by crystallization from the aqueous solution upon the cooling and evaporation thereof. The terpene alcohols obtained are approximately 98% pure, and the various alcohols present, i. e., borneol, fenchyl alcohol, terpineol, may be isolated by fractional crystallization or other known processes of separation.

When it is desired to separate the tertiary terpene alcohols present in pine oil by proceeding as described above, it is essential that the temperature at no time, that is, neither during esterification, distillation, nor hydrolysis, be permitted to rise above 150° C. Above this temperature the borates of tertiary terpene alcohols are decomposed into terpene hydrocarbons, boric acid and water. The entire procedure must accordingly, in such cases, be conducted at a temperature within about the range 100°–150° C.

However, when it is desired to separate only secondary terpene alcohols unmixed with tertiary terpene alcohols from pine oil, either the esterification, or the distillation, or both, will be carried out at a temperature above 150° C., preferably at about 165° C.–170° C. at atmospheric pressure, or at about 160° C.–165° C. at partial pressures of the order of 675–700 mm. By so proceeding the tertiary terpene alcohols present in pine oil will be converted into dipentene and terpinene, terpene hydrocarbons and only the borates of secondary terpene alcohols will be formed. These on hydrolysis will yield substantially pure borneol and fenchyl alcohol.

If desired, the terpene hydrocarbons, terpinene and dipentene, may be recovered in substantially pure form by carrying out the esterification and distillation steps at a temperature below 150° C., thus forming the borates of the tertiary alcohols, and then before hydrolysis raising the temperature to about 150° C. to 170° C., whereby the tertiary borates are decomposed and dipentene and terpinene may be distilled off from the secondary borates. These latter are then hydrolyzed as described.

It will be appreciated that no particular type of apparatus is necessary for carrying out the method in accordance with this invention, but that those types of apparatus usually and customarily used for esterification, distillation, steam distillation procedure, etc., may be employed.

By the method in accordance with this invention it is possible to recover from pine oil in a single operation terpene alcohols of high purity, whereas repeated fractionations and separations were hitherto necessary to obtain terpene alcohols of lower purity. It is furthermore possible to recover secondary alcohols of 95–100% purity directly from pine oil, and to produce as valuable by-products dipentene and terpinene. Also estragol, a terpene ether, may be recovered from the non-alcoholic portion of pine oil after separation of the alcohols. This ether could not hitherto be commercially isolated from pine oils, due to the incompleteness of the separation of the terpene alcohols. It will accordingly be appreciated that the method in accordance with this invention is highly advantageous in many respects.

It will be understood that the details set forth hereinabove are given by way of illustration and example only and are not to be construed as limiting the scope of this invention.

What I claim and desire to protect by Letters Patent is:

1. A method for the separation of terpene alcohols from longleaf yellow pine oil which includes treating longleaf yellow pine oil with boric acid under conditions such that secondary terpene alcohols present are converted into borates while tertiary terpene alcohols are decomposed to terpene hydrocarbons, separating said secondary terpene alcohol borates from non-alcoholic terpenes present, hydrolyzing said secondary terpene alcohol borates and recovering secondary terpene alcohols.

2. A method for the separation of terpene alcohols from longleaf yellow pine oil which includes treating longleaf yellow pine oil with boric acid under conditions such that secondary terpene alcohols present are converted into borates, separating said secondary terpene alcohol borates from non-alcoholic terpenes present and from tertiary alcohol borates formed from tertiary alcohol constituents of the pine oil, hydrolyzing said secondary terpene alcohol borates and recovering secondary terpene alcohols.

3. A method for the separation of terpene alcohols from longleaf yellow pine oil which includes treating longleaf yellow pine oil with boric acid at a temperature of from about 100° C. to about 170° C. to convert terpene alcohols present into borates, distilling off non-alcoholic constituents of the pine oil from said terpene alcohol borates under reduced pressure at a temperature below 170° C., hydrolyzing said terpene alcohol borates by distillation with steam and recovering terpene alcohols from the distillate.

4. A method for the separation of terpene alcohols from longleaf yellow pine oil which includes treating longleaf yellow pine oil with boric acid at a temperature of from about 100° C. to about 150° C. to convert terpene alcohols present into borates, distilling off non-alcoholic constituents of the pine oil from said terpene alcohol borates under reduced pressure at a temperature below 150° C., hydrolyzing said terpene alcohol borates by distillation with steam and recovering terpene alcohols from the distillate.

5. A method for the separation of terpene alcohols from longleaf yellow pine oil which includes treating longleaf yellow pine oil with boric acid at a temperature of from about 160° C. to about 170° C., whereby secondary terpene alcohols present are converted into borates while tertiary terpene alcohols present are converted into terpinene and dipentene, distilling off non-alcoholic terpenes present from said secondary terpene alcohol borates under reduced pressure at a temperature below 170° C., hydrolyzing said secondary terpene alcohol borates by distillation with steam and recovering secondary terpene alcohols from the distillate.

6. A method for the separation of terpene alcohols from longleaf yellow pine oil which includes treating longleaf yellow pine oil with boric acid at a temperature of from about 100° C. to about 150° C. to convert terpene alcohols present into borates, distilling off non-alcoholic constituents of the pine oil from said terpene alcohol borates under reduced pressure at a temperature below 150° C., heating said terpene alcohol borates at a temperature of from about 160° C. to about 170° C., whereby tertiary terpene alcohol borates present are converted into terpinene and dipentene, separating secondary alcohol borates from terpinene and dipentene, hydrolyzing said secondary terpene alcohol borates by distillation with steam and recovering secondary terpene alcohols from the distillate.

7. A method for the separation of terpene alcohols from longleaf yellow pine oil which includes treating longleaf yellow pine oil with boric acid at a temperature of from about 100° C. to about 150° C. to convert terpene alcohols present into borates, distilling off non-alcoholic constituents of the pine oil from said terpene alcohol borates under reduced pressure at a temperature of from about 160° C. to about 170° C., whereby tertiary alcohol borates are converted into terpinene and dipentene and removed, hydrolyzing the secondary terpene alcohol borates by distillation with steam and recovering secondary terpene alcohols from the distillate.

8. A method for the separation of terpene alcohols from longleaf yellow pine oil which includes treating longleaf yellow pine oil with boric acid at a temperature of from about 100° C. to about 170° C. to convert terpene alcohols present into borates, distilling off non-alcoholic constituents of the pine oil from said terpene alcohol borates under reduced pressure at a temperature below 170° C., hydrolyzing said terpene alcohol borates and recovering terpene alcohols.

9. A method for the separation of terpene alcohols from longleaf yellow pine oil which includes treating longleaf yellow pine oil with boric acid at a temperature of from about 100° C. to about 150° C. to convert terpene alcohols present into borates, distilling off non-alcoholic constituents of the pine oil from said terpene alcohol borates under reduced pressure at a temperature below 150° C., hydrolyzing said terpene alcohol borates and recovering terpene alcohols.

10. A method for the separation of a terpene alcohol from longleaf yellow pine oil which includes treating longleaf yellow pine oil with boric acid under conditions such that a terpene alcohol present in the pine oil is converted into a borate, separating the terpene alcohol borate formed from the reaction mass, hydrolyzing the terpene alcohol borate and recovering the terpene alcohol.

DONALD H. SHEFFIELD.